US007070378B2

(12) United States Patent
Grabowski

(10) Patent No.: US 7,070,378 B2
(45) Date of Patent: Jul. 4, 2006

(54) HEATSTAKE

(75) Inventor: David Norbert Grabowski, Clarkston, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/501,206

(22) PCT Filed: Jan. 6, 2003

(86) PCT No.: PCT/US03/00222

§ 371 (c)(1),
(2), (4) Date: Jul. 9, 2004

(87) PCT Pub. No.: WO03/059605

PCT Pub. Date: Jul. 24, 2003

(65) Prior Publication Data

US 2005/0207864 A1 Sep. 22, 2005

Related U.S. Application Data

(60) Provisional application No. 60/347,167, filed on Jan. 9, 2002.

(51) Int. Cl.
*F16B 19/08* (2006.01)

(52) U.S. Cl. ....................................... 411/501; 264/249

(58) Field of Classification Search ................ 411/501, 411/502, 57.1; 264/249
See application file for complete search history.

(56) References Cited

U.S. PATENT DOCUMENTS

| | | | | | |
|---|---|---|---|---|---|
| 586,770 | A | * | 7/1897 | Kempshall | 24/713.8 |
| 1,122,280 | A | * | 12/1914 | Kempshall | 29/505 |
| 1,475,827 | A | | 11/1923 | Hogarty | |
| 1,951,168 | A | * | 3/1934 | Roth | 411/501 |
| 2,065,333 | A | | 12/1936 | Kirley | |
| 2,292,239 | A | * | 8/1942 | Pierce et al. | 36/59 R |
| 2,451,356 | A | * | 10/1948 | Rechton | 29/509 |
| 3,499,808 | A | * | 3/1970 | Obeda | 264/249 |
| 3,544,143 | A | * | 12/1970 | Ohlsson | 403/265 |
| 4,761,871 | A | * | 8/1988 | O'Connor et al. | 29/432.1 |
| 5,988,964 | A | * | 11/1999 | Lins et al. | 411/30 |

* cited by examiner

*Primary Examiner*—Flemming Saether
(74) *Attorney, Agent, or Firm*—Honigman Miller Schwartz and Cohn LLP

(57) ABSTRACT

A heatstake for fastening a workpiece includes a base portion (12) having at least one shaft portion (22). A central passage (30) extends though the shaft portion from its leading end (28) to the base portion. A plurality of slots (22) are disposed about an outer surface (34) of the shaft portion (22). The plurality of slots (32) have a predefined angular separation. Preferably, the plurality of slots (32) disposed about the outer surface of the shaft portion form a heatstake having multiple fastening portions. The multiple fastening portions are adapted to form a geometric flower shape for increasing the fastening strength of a heatstake when staked.

19 Claims, 7 Drawing Sheets

Fig. 2
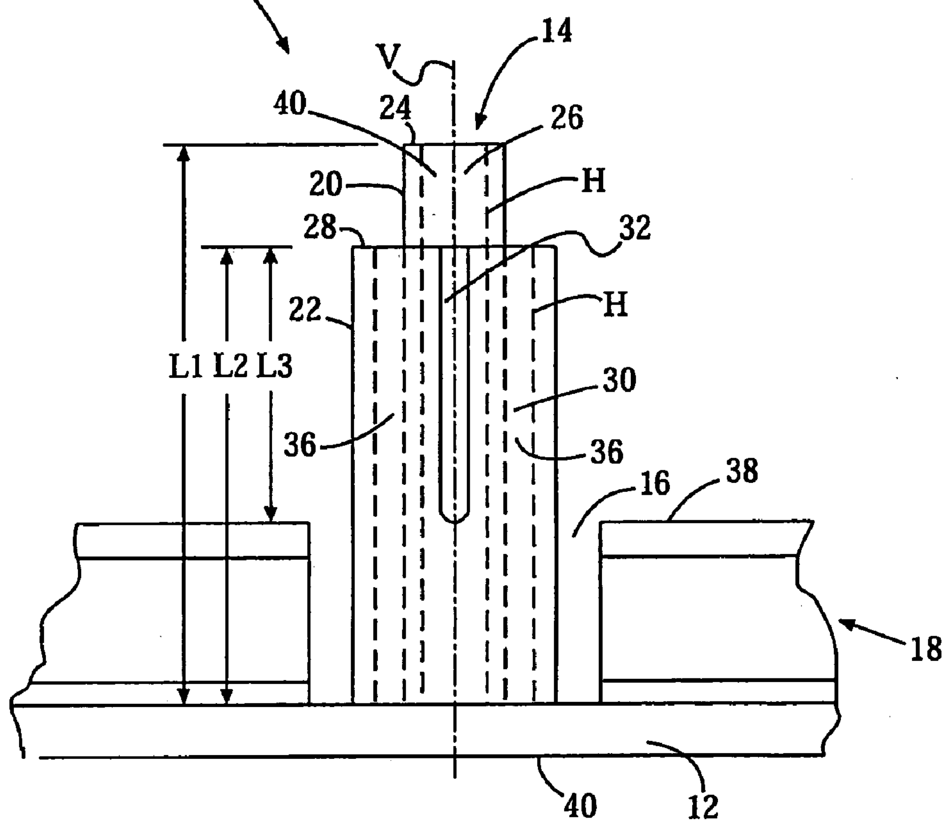
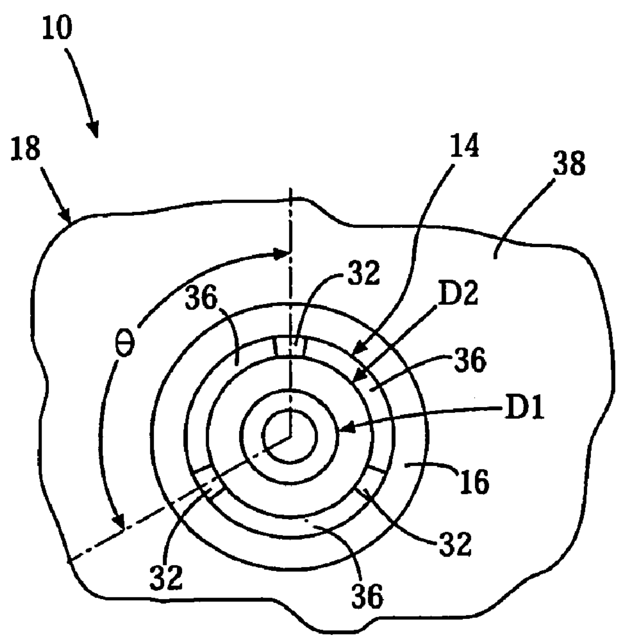
Fig. 3a

Fig. 6
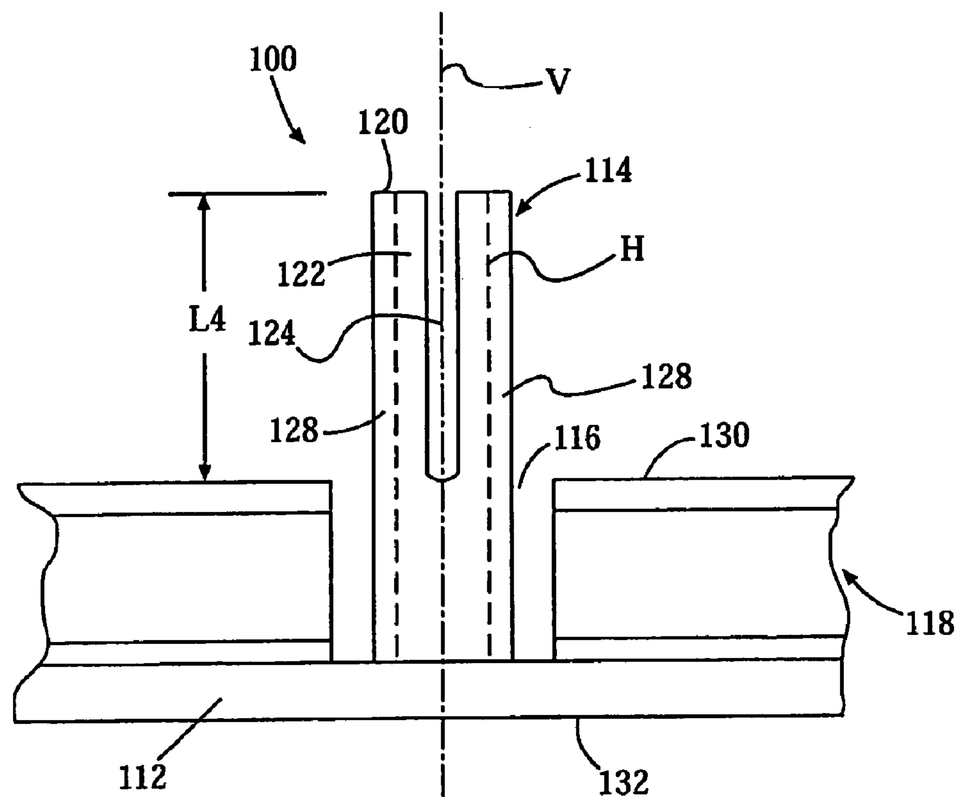
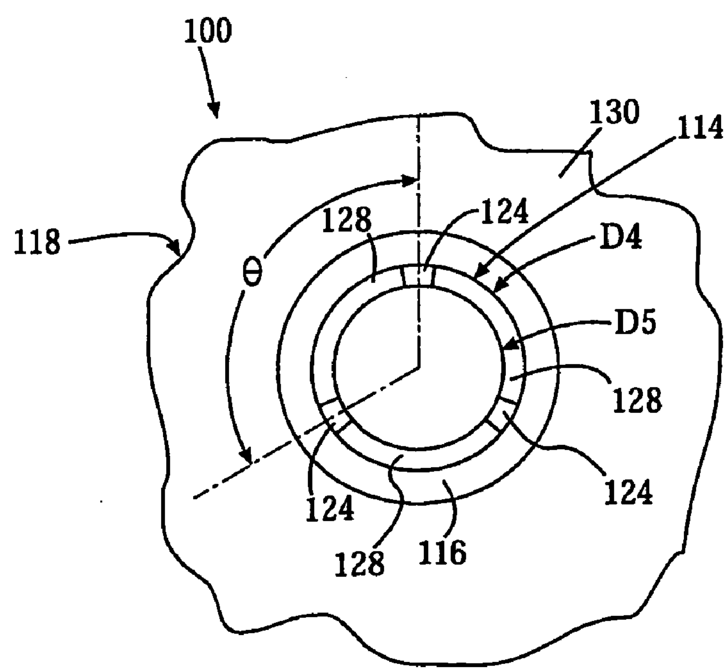
Fig. 7

HEATSTAKE

TECHNICAL FIELD

The present invention relates to a fastener, and in particular to a heatstake fastener that has multiple fastening portions for fastening a workpiece.

BACKGROUND OF THE INVENTION

Conventional heatstakes normally employ a base portion having a shaft portion that extends through a passage of a workpiece. When the shaft portion is heat-staked, the result is a deformed fastener about the passage and fastening surface of the workpiece. The deformed shaft for this conventional heatstake does not provide a uniform, consistent, or completely fastened workpiece during the staking operation. The shaft portion deforms freely in an uncontrolled fashion and is completely governed by the staking device. If the shaft is not heat-staked properly, only a portion of the deformed shaft will contact the fastening surface, resulting in an insufficient fastener. Further, the shaft portion may be staked entirely through the workpiece passage and may never contact the fastening surface, resulting in the absence of a fastener for the workpiece.

SUMMARY OF THE INVENTION

The inventor of the present invention has recognized that the shaft portion of conventional heatstakes deform freely in an uncontrolled fashion. To this end, the inventor has developed a heatstake having a shaft portion that can be staked in a controlled fashion. Thus, an object of the present invention is to provide a heatstake that results in a uniform, consistent, and generally fastened workpiece.

The heatstake comprises a base portion having at least one shaft portion. The shaft portion is defined by a leading end and a central passage that extends through the shaft portion. The central passage is formed by an opening at the leading end. A plurality of slots are disposed about an outer surface of the shaft portion. The plurality of slots have a predefined angular separation. The plurality of slots disposed about the outer surface of the shaft portion form a heatstake having multiple fastening portions, which when staked, allow the formation a uniform, consistent, and completely fastened workpiece.

BRIEF DESCRIPTION OF THE DRAWINGS

The present invention will now be described, by way of example, with reference to the accompanying drawings, in which:

FIG. 2 is a cross-sectional view of the heatstake of FIG. 1;

FIG. 3*a* is a top view of the heatstake of FIG. 1;

FIG. 6 is a cross-sectional view of the heatstake of FIG. 5;

FIG. 7 is a top view of the heatstake of FIG. 5.

DESCRIPTION OF THE PREFERRED EMBODIMENT

Figure 1:
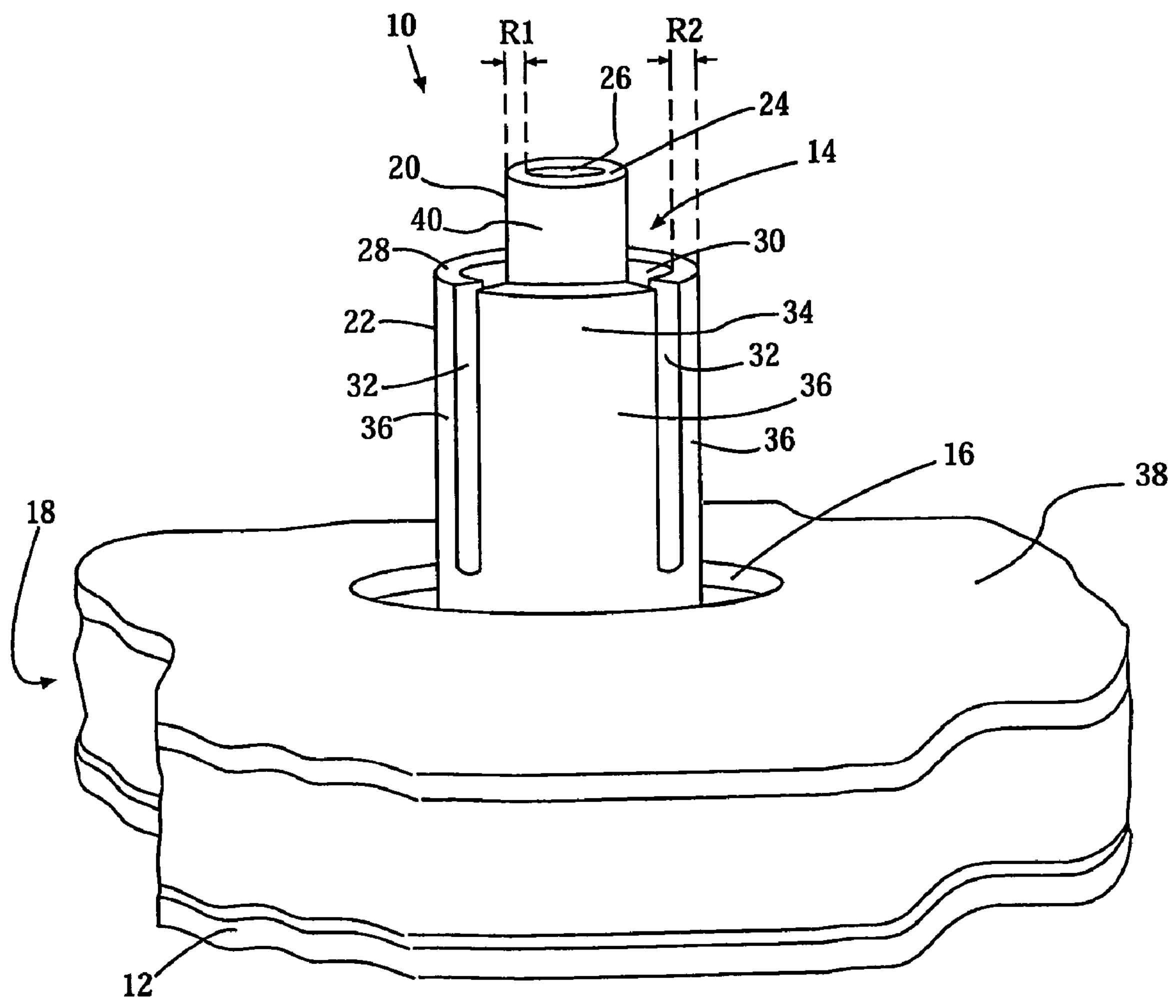
FIG. 1 is a perspective view of the heatstake.

The present invention is directed to a heatstake having a base and shaft portion that allows the formation of a uniform, consistent, and generally fastened workpiece. FIG. 1 shows the heatstake, shown generally at 10, before being staked. The term "staked" is generally applied to a staking operation that includes any one of a plurality of fastening methods known in the art, such as conventional welding, ultrasonic welding, and the like. Preferably, the heatstake is made of a rigid plastic material such as a polypropylene, nylon, Acrylnitril-Butadien-Styrol-Copolymere (ABS), and the like. It will be appreciated that the invention is not limited by the type of material, and that the invention can be practiced with any suitable deformable material that can allow the user to stake the heatstake 10 in a uniform and consistent fashion.

Referring now to FIGS. 1–3*a*, the heatstake is shown having a base portion 12 and a shaft portion 14. The shaft portion 14 extends through a passage 16 of a workpiece 18. The shaft portion 14 includes a first or inner shaft portion 20 and a second or outer shaft portion 22. The first shaft portion 20 is defined by a first leading end 24 and a first central passage 26. The second shaft portion 22 is defined by a second leading end 28 and a second central passage 30. The first shaft portion 20 is generally concentrically disposed about the second central passage 30 of the second shaft portion 22 to form a dual heatstake configuration. The first shaft portion 20 is further defined as to having an outer diameter D1 that is less than the inner diameter D2 of the second shaft portion 22 FIG. 3*a*). The first and second central passages 26, 30 generally concentrically extend through the first 20 and second shaft portion 22 from the first and second leading ends 24, 28, respectively. Preferably, the first shaft portion 20 has a length, L1, that is greater than a length, L2, of the second shaft portion 22 (FIG. 2). Because the length, L1, of the first shaft portion 20 is greater than the length L2 of the second shaft portion 22, the leading end 24 of the first shaft portion 20 comes into contact with the staking device (not shown) before the leading end 28 of the second shaft portion 22.

One aspect of the invention is that a plurality of slots 32 are disposed through an outer surface 34 of the second shaft portion 22. In this embodiment, the plurality of slots 32 have an angular separation, θ (FIG. 3*a*). The user may selectively design the amount of slots 32 needed for a particular heatstake design. Each slot 32 forms a fastening portion 36 that securely contacts a fastening surface 38 of a workpiece 18 when the heatstake 10 is staked. The slots 32 may be positioned so as to define the predefined angular separation θ having substantially equivalent angles that help ensure that the shaft portion 14, when staked, will securely and positively engage the fastening surface 38.

For example, the heatstake 10 shown in FIG. 3*a* includes three slots 32 having an angular separation, θ, of approximately 120°. When the heatstake 10 is staked, the deformed heatstake fastens to the workpiece 18 with three fastening portions 36 that securely and positively engage the fastening surface 38 of the workpiece 18. However, it will be appreciated that the invention is not limited to having only three slots 32 with an angular separation, θ, of approximately 120°. The invention can be practiced with any suitable number of slots that allow the user to stake the heatstake in any desired fashion. For example, the heatstake may have eight slots with an angular separation, θ, of approximately 45° that when staked forms eight fastening portions 36. In general, the angle separation, θ, between the slots 32 is defined by the following expression: θ=(360/N) degrees, where N is the number of slots. The expression for θgenerally defines an equivalent angular separation for each slot 32. However, it will be appreciated that the above expression for θ may not necessarily limit the heatstake 10 from using only equivalent angles. The slots 32 may be designed with any angular displacement, which may not necessarily include equivalent angles, θ, that will adequately fasten the heatstake to the workpiece.

The invention is not limited by the number of outer shaft portions. For example, in an alternate embodiment to the heatstake design shown in FIG. 3*b*, a heatstake 10*a* may further comprise a third shaft portion 22*a* including three fastening portions 36*a* defined by three slots 32*a* having an angular displacement, θa, of approximately 120°. The third shaft portion 22*a* is further defined as to having an inner diameter D3 that is greater than the outer diameter opposite the inner diameter D2 of the second shaft portion 22. The slots 32*a* are centrally positioned opposite that of fastening portions 36 of the second shaft portion 22. The third shaft portion 22*a* may also have a length (not shown) that is less than the length, L2, of the second shaft portion 22. When the heatstake 10*a* is staked, the deformed heatstake fastens to the workpiece 18 with three additional fastening portions 36*a* that complements the fastening portions 36 of the second shaft portion 22. The fastening portions 36 and 36*a* securely and positively engage the fastening surface 38 of the workpiece 18. However, it will be appreciated that the invention is not limited to having only three slots 32*a* with an angular separation, θa, of approximately 120°. As explained above, the invention can be practiced with any suitable number of slots that allow the user to stake the heatstake in any desired fashion with a variety of displacement angles, θa.

Referring back to the original embodiment shown in FIGS. 1–3*a*, FIG. 2 shows a cross-sectional view of the heatstake 10 before it is staked. Hidden lines, H, show the first and second central passages 26, 30 generally concentrically extending through the first and second shaft portions 20, 22 about a central axis, V. The passage 26 extends from its leading end 24 to the base portion 12. Although the passage 26 is not shown extending through the base portion 12, the passage 26 may extend through the base portion 12 to provide an opening (not shown) in an opposing surface 40. The slots 32 of the second shaft portion 22 have a length, L3, defined from the second leading end 28 and extend proximate the fastening surface 38 of the workpiece 18. It will be appreciated that the length, such as the length L3, may extend to any desired length of the second shaft portion 22, or a length less than L2.

The staking operation is performed by centrally inserting a staking device (not shown) into the first central passage 26 about the first leading end 24. The staking operation causes the first shaft portion 20 to deform vertically downward and radially outward about the vertical axis, V, against the second shaft portion 22 having the plurality of slots 32 with the predefined angular separation, θ. In addition, each fastening portion 36 of the second shaft portion 22 deforms vertically downward and radially outward about the vertical axis, V, toward the fastening surface 38 of a workpiece 18. Because the first shaft portion 20 has a generally solid, cylindrical outer surface 40, the fastening portions 36 that deform radially outward from the vertical axis, V, apply a substantially uniform and continuous pressure to the fastening portions 36. When the shaft 14 is deformed in this fashion, the fastening portions 36 are deformed uniformly and consistently, thereby providing a generally fastened workpiece 18 about the fastening surface 38.

Figure 3B:
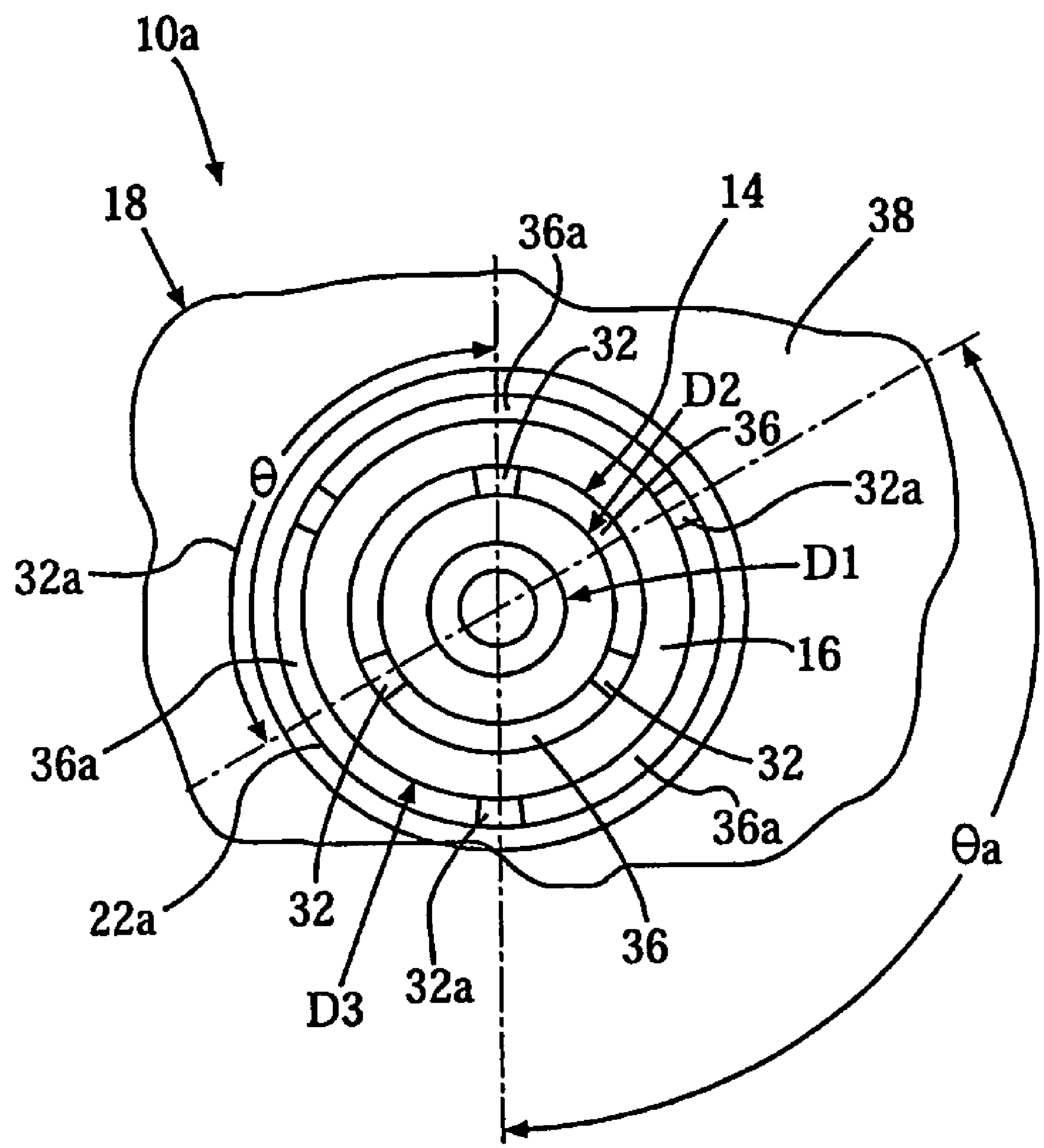
FIG. 3*b* is a top view of an alternate embodiment of the heatstake of FIG. 1.
Figure 4A:
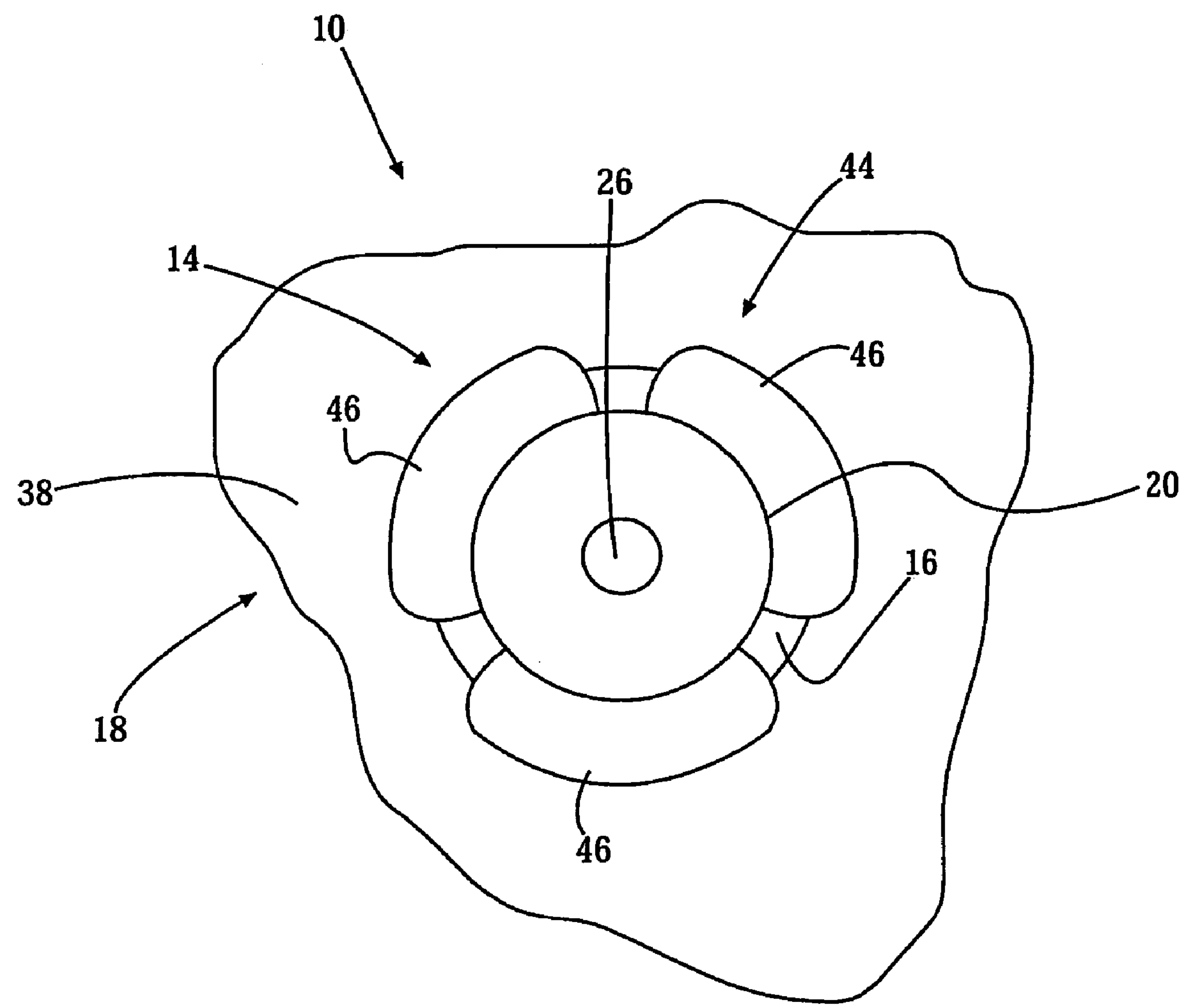
FIG. 4*a* is a top view of a staked heatstake of FIG. 3*a;*
Figure 4B:
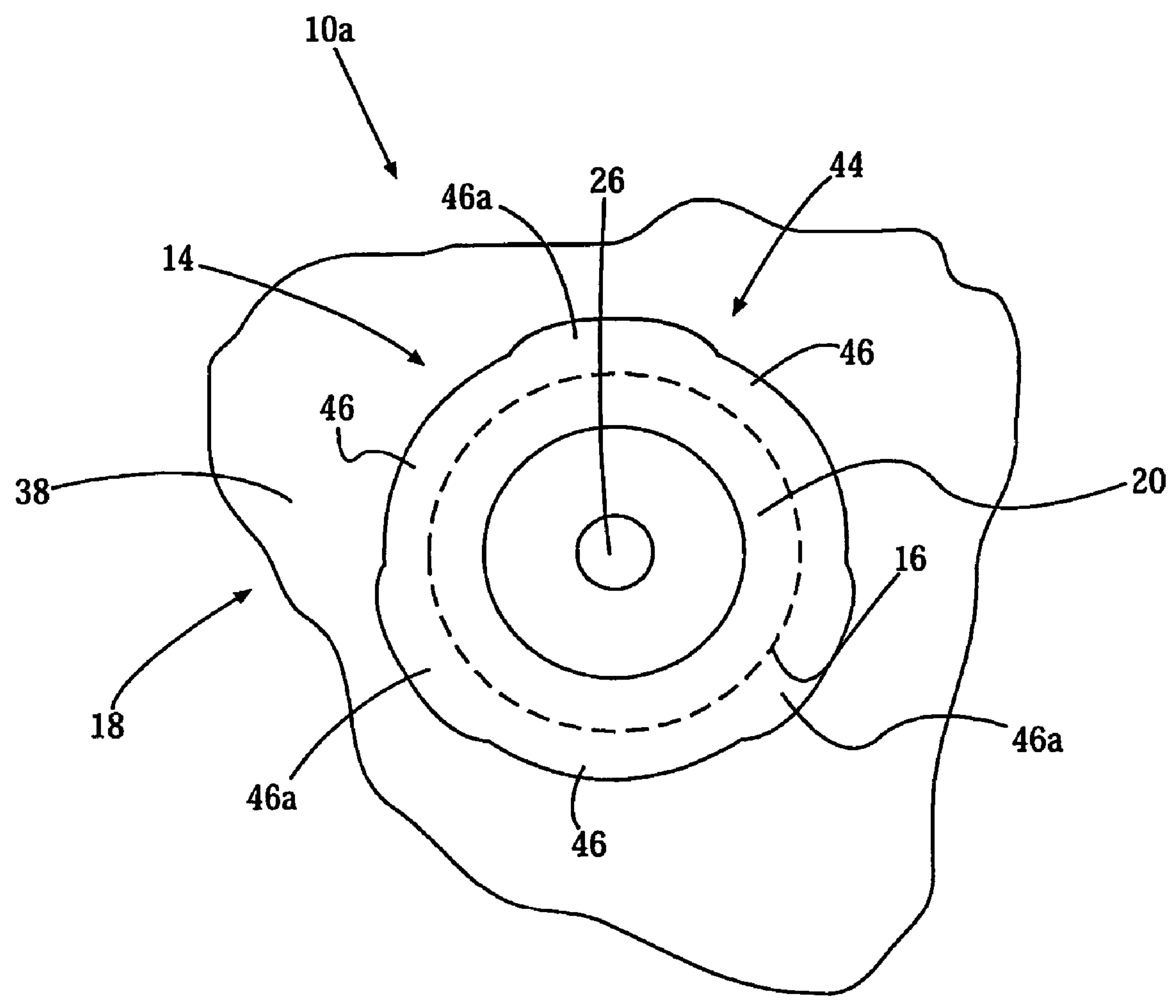
FIG. 4*b* is a top view of an alternate embodiment of a staked heatstake according to FIG. 3*b;*

As seen in FIG. 4*a*, the deformed heatstake 10 having three slots 32 forms a geometric configuration of a deformed first shaft portion 20 in a generally circular shape having a second shaft portion 22 deformed in the shape of a rosette or flower 44 with three pedals 46 separated approximately 120° apart. FIG. 4*b* shows the deformed heatstake 10*a* according to the alternate heatstake design of FIG. 3*b*. As shown in FIG. 4*b*, the second shaft portion 22 and third shaft portion 22*a* are deformed in the shape of a rosette or flower 44 with two series of three pedals 46, 46*a*, separated approximately 120° apart, respectively. The flowering pattern 44*a* shown in FIG. 4*b* is similar to the flowering pattern 44 shown in FIG. 4*a*, except that the passage 16 (shown by dashed lines), formed in the workpiece 18 is completely covered by the pedals 46*a*. Thus, one advantage of the alternate embodiment shown in FIGS. 3*b*, 4*b* is that the third shaft portion 22*a* provides an increased fastening strength as compared to the embodiment shown in FIGS. 3*a*, 4*a*, because of the increase in the amount of surface area, provided by pedals 46*a*, contacting the fastening surface 38 by the heatstake 10*a*.

The shape of each pedal 46, 46*a* is controlled by a combination of a number of factors that include inherent characteristics of the heatstake 10, 10*a*, as well as the conditions of the staking process. Inherent characteristics that result in the 'mushrooming' or deformation of each pedal 46, 46*a* includes the material used in the construction of the heatstake 10, 10*a*, as well as the radial thickness R1 and R2 of the first and second shaft portions 20, 22, respectively (FIG. 1). If the radial thickness R2 extends to a sufficient thickness, the volume of material used for the second shaft portion 22 will also increase, which results in larger flowered-out pedals 46 that will completely engage the passage 16. Thus, the passage 16 may also be completely covered by using the first and second shaft portions 20, 22 of the embodiment shown in FIG. 3*a*. During the staking process, conditions, such as the amount of heat and the time that the heat is applied to the heatstake 10, 10*a*, also generally determines the 'mushrooming' or deformation of each pedal 46, 46*a*.

The deformed first shaft portion 20 for both embodiments shown in FIGS. 4*a* and 4*b* fastens to the workpiece 18 as each pedal 46, 46*a* increases the fastening strength of the deformed heatstake 10 to the fastening surface 38. However, the invention is not limited to having only three slots 32, 32*a*. For example, as shown above, the heatstake 10, 10*a* may have any desired number of slots 32, 32*a* designed with any angular displacement, which may not necessarily include equivalent angles, θ, that will adequately fasten the heatstake to the workpiece. It will be appreciated that the number of slots 32, 32*a* determines the number of fastening portions 36, 36*a*, which in turn determines the number of pedals 46, 46*a* on the deformed heatstake 10, 10*a*, respectively.

Figure 5:
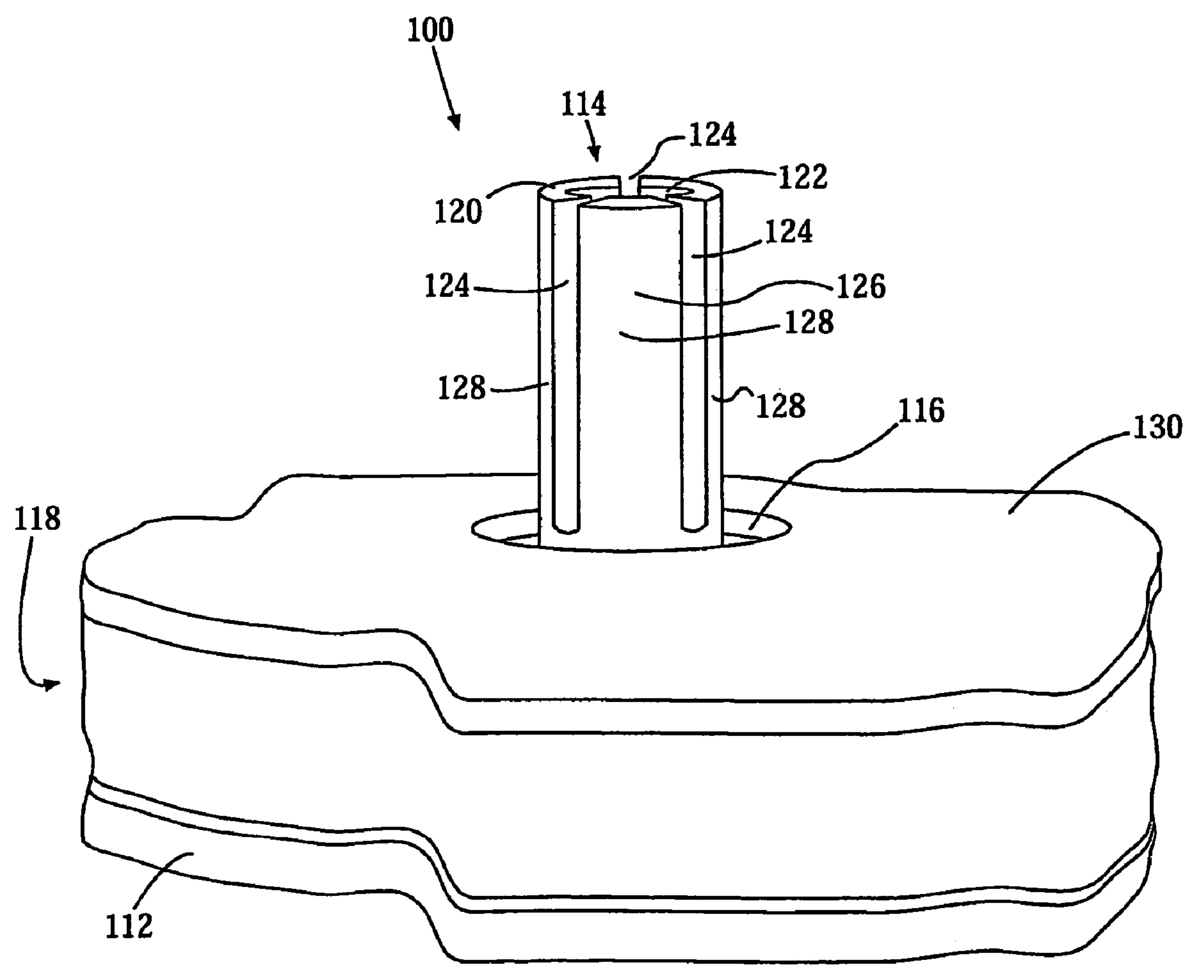
FIG. 5 is a perspective view of an alternate embodiment of the heatstake.

FIG. 5 shows an alternate embodiment of a heatstake 100 according to the invention. In general, the heatstake 100 is substantially identical to the heatstake 10, except that the heatstake 100 does not include the first shaft portion 20. The heatstake 100 includes a base portion 112 and a single shaft portion 114. The shaft portion 114 extends through a passage 116 of a workpiece 118. The shaft portion 114 is defined by a leading end 120 and a central passage 122. The first shaft portion is further defined as to having an outer diameter D4 and an inner diameter D5 that is less than the outer diameter D4 (FIG. 7). A plurality of slots 124 are disposed about an outer surface 126 of the shaft portion 114.

Like the first embodiment shown above, the plurality of slots 124 have a angular separation, θ (FIG. 7). The user may selectively design the amount of slots 124 needed for the present embodiment having a single shaft portion 114 in the heatstake 100. Each slot 124 forms a fastening portion 128 that securely contacts a fastening surface 130 of a workpiece 118 when the heatstake 100 is staked. The slots 124 may be positioned so as to define the predefined angular separation θ having substantively equivalent angles that help ensure that the shaft portion 114, when staked, will generally and positively engage the fastening surface 130. For example, the heatstake 100 shown in FIG. 7 includes three slots 124 having an angular separation, θ, of approximately 120°. When the heatstake 100 is staked, the deformed heatstake fastens to the workpiece 118 with three fastening portions 128 that securely and positively engage surface 130 of the workpiece 118. However, it will be appreciated that the invention is not limited to having only three slots 124 with an angular separation, θ, of approximately 120°. The invention can be practiced with any suitable number of slots that allow the user to stake the heatstake in any desired fashion. For example, the heatstake may have eight slots with an angular separation, θ, of approximately 45° that when staked forms eight fastening portions 128.

FIG. 6 shows a cross-sectional view of the heatstake 100 before it is staked. As discussed above, hidden lines H show the central passage 122 extending through the shaft portion 114 about central axis V. Although the passage 122 is not shown extending through the base portion 112, the passage 122 may extend through the base portion 112 to provide an opening (not shown) in an opposing surface 132. The slots 124 of the shaft portion 114 have a length, L4, defined from the leading end 120 and extend proximate the fastening surface 130 of the workpiece 118. It will be appreciated that the length L4 may extend to any desired length, such as the length of the shaft portion 114, or a length less than L4.

The staking operation is performed by centrally inserting a staking device (not shown) into the first central passage 122 about the leading end 120. The staking operation causes the shaft portion 114 to deform vertically downward and radially outward about the vertical axis, V, so that the fastening portions 128 defined by the plurality of slots 124 with the predefined angular separation, θ, generally and positively engage the fastening surface 130 of the workpiece 118. When the shaft 114 is deformed in this fashion, the fastening portions 128 are deformed uniformly and consistently, thereby providing a generally fastened workpiece 118 about the fastening surface 130.

The end result of the staking operation is a deformed heatstake 100 that forms a geometric configuration of a rosette or flower with three pedals that are separated approximately 120° apart. The deformed shaft portion 114 fastens to the workpiece 118 with each pedal. As discussed above, the invention is not limited to having only three slots with an angular separation of approximately 120°. For example, the deformed heatstake 100 may have any desired number of slots 124 that will adequately fasten the heatstake to the workpiece.

Another advantage of the present invention is the ability to design and form a heatstake on a workpiece through injection molding. The heatstake described above can be injection molded onto a workpiece before the performance of a staling operation. The ability to provide a heatstake that can be injection molded onto a workpiece before the implementation of a staking process can allow for easier and faster assembly.

It will be appreciated that there are many different ways in which to maintain a uniform, consistent, and complete fastener other than the embodiments shown for heatstakes 10, 10*a*, and 100. Any different combination, addition, or withdrawal of the amount of stakes, slots, or angular displacement θ can be used to improve upon the fastening strength or deformation consistency disclosed herein. It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A heatstake fastener for fastening at least two workpieces, comprising:

first and second concentrically disposed shaft portions, the first shaft portion having a leading end and a length greater than a length of the second shaft portion, wherein said second shaft portion is adapted to be received in a hole defined in one of the workpieces;

a central passage extending through the first and second shaft portions; and a plurality of slots disposed about an outer surface of the second shaft portion having a predefined angular separation, the plurality of slots defining a plurality of fastening portions when the second shaft portion is deformed, whereby the fastening portions are adapted to conform to a surface of the one of the workpieces beyond a perimeter of the hole, wherein the first shaft portion applies pressure against the fastening portions of the second shaft portion when the first shaft portion is deformed, and wherein said fastening portions of said second shaft portion engages said one of the workpieces when said second shaft portion is deformed.

2. The heatstake according to claim 1 wherein the plurality of slots comprises at least three slots.

3. The heatstake according to claim 2, wherein the predefined angular separation is approximately 120 degrees.

4. The heatstake according to claim 1, wherein the fastening portions of the second shaft portion form a geometric configuration in the form of a rosette or flower shape.

5. The heatstake according to claim 1, wherein said first and second shaft portions define a gap therebetween.

6. The heatstake according to claim 1, wherein said first and second shaft portions are made of thermoplastic material.

7. The heatstake according to claim 1, wherein the heatstake fastener extends from another one of the at least two workpieces.

8. A heatstake fastener for fastening at least two workpieces, comprising:

a first shaft portion including a first leading end and a first central passage;

a second shaft portion adapted to be received in a hole defined in one of the workpieces, said second shaft portion including a second leading end, a second central passage, and a plurality of slots disposed about an outer surface having a predefined angular separation, the plurality of slots defining a plurality of fastening portions when the second shaft portion is deformed, whereby the fastening portions are adapted to conform to a surface of the one of the workpieces beyond a perimeter of the hole, wherein the first shah portion is generally concentrically disposed about the second central passage of the second shaft portion such that the first shaft portion applies pressure against the fastening portions of the second shaft portion when the first shaft portion is deformed, and wherein said fastening portions of said second shaft portion engages said one of the workpieces when said second shaft portion is deformed.

9. The heatstake according to claim 8, wherein the first shaft portion has an outer diameter less than an inner diameter of the second shaft portion.

10. The heatstake according to claim 8, wherein the plurality of slots comprises at least three slots.

11. The heatstake according to claim 10, wherein the predefined angular separation is approximately 120 degrees.

12. The heatstake according to claim 8, further comprising a gap between an outer diameter of said first shalt portion and an inner diameter of said second shaft portion.

13. The heatstake according to claim 8, wherein said first and second shaft portions are made of thermoplastic material.

14. The heatstake according to claim 8, wherein the heatstake fastener extends from another one of the at least two workpieces.

15. A method of deforming a heatstake fastener for fastening at least two workpieces in a controlled fashion, the heatstake comprising a base portion, first and second concentrically disposed shaft portions, the first shaft portion having a leading end and a length greater than the second shaft portion, a central passage extending through the first and second shaft portions, the second shaft portion adapted to be received in a hole defined in one of the workpieces; and a plurality of slots disposed about an outer surface of the second shaft portion having a predefined angular separation, the plurality of slots defining a plurality of fastening portions when the second shaft portion is deformed, the method comprising the steps of:

deforming the first shalt portion vertically downward and radially outward about a vertical axis of the first shaft portion such that the first shaft portion positively engages the one of the workpieces, and deforming the second shaft portion such that the fastening portion of the second shaft portion positively engages the one of the workpieces whereby the fastening portions conform to a surface of the one of the workpieces beyond a perimeter of the hole.

16. The method according to claim 15, wherein the fastening portions define a geometric configuration in the form of a rosette or flower shape.

17. The method according to claim 15, further comprising a gap between an outer diameter of said first shaft portion and an inner diameter of said second shaft portion.

18. The method according to claim 15, wherein said first and second shaft portions are made of thermoplastic material.

19. The heatstake according to claim 15, wherein the heatstake fastener extends from another one of the at least two workpieces.

* * * * *

UNITED STATES PATENT AND TRADEMARK OFFICE

CERTIFICATE OF CORRECTION

PATENT NO. : 7,070,378 B2
APPLICATION NO. : 10/501206
DATED : July 4, 2006
INVENTOR(S) : David N. Grabowski It is certified that error appears in the above-identified patent and that said Letters Patent is hereby corrected as shown below:

Column 7, Line 4, please delete “shah” and insert --shaft--.

Column 7, Line 21, please delete “shalt” and insert --shaft--.

Signed and Sealed this

Fifth Day of September, 2006

JON W. DUDAS
*Director of the United States Patent and Trademark Office*